United States Patent
Bott

(10) Patent No.: US 10,202,025 B2
(45) Date of Patent: Feb. 12, 2019

(54) VEHICLE ROOF MODULE HAVING A ROOF ELEMENT AND A ROLLER BLIND APPARATUS

(71) Applicant: WEBASTO SE, Stockdorf (DE)

(72) Inventor: Guido Bott, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 15/567,257

(22) PCT Filed: Mar. 23, 2016

(86) PCT No.: PCT/EP2016/056442
§ 371 (c)(1),
(2) Date: Oct. 17, 2017

(87) PCT Pub. No.: WO2016/169724
PCT Pub. Date: Oct. 27, 2016

(65) Prior Publication Data
US 2018/0105025 A1 Apr. 19, 2018

(30) Foreign Application Priority Data
Apr. 23, 2015 (DE) .......................... 10 2015 005 167

(51) Int. Cl.
*B60J 7/00* (2006.01)
(52) U.S. Cl.
CPC .................... *B60J 7/0015* (2013.01)
(58) Field of Classification Search
CPC ........................................ B60J 7/0015
USPC ......................................... 296/214
See application file for complete search history.

(56) References Cited

U.S. PATENT DOCUMENTS

| 8,465,087 B2 * | 6/2013 | Gerwolls | F16F 7/12 188/377 |
|---|---|---|---|
| 2002/0021029 A1 | 2/2002 | Bohm et al. | |
| 2002/0043581 A1 | 4/2002 | Peeters | |
| 2008/0190571 A1 | 8/2008 | Wimmer | |

FOREIGN PATENT DOCUMENTS

| DE | 10039522 A1 | 2/2002 |
|---|---|---|
| DE | 102005015602 A1 | 10/2006 |
| DE | 102005056331 B3 | 5/2007 |
| DE | 102006046105 A1 | 4/2008 |
| DE | 102007024359 B3 | 12/2008 |

(Continued)

OTHER PUBLICATIONS

International Search Report for PCT/EP2016/056442 dated Jun. 20, 2016 and English translation submitted herewith (7 Pages).

(Continued)

*Primary Examiner* — Dennis H Pedder
(74) *Attorney, Agent, or Firm* — Fitch, Even, Tabin & Flannery, LLP

(57) ABSTRACT

A vehicle roof module having a transparent roof element and a roller blind apparatus arranged under the roof element and having a roller blind track, which is wound on a winding shaft and can be pulled out to cover the underside of the roof element, and which is guided by a drain edge when pulled out from the winding shaft, wherein, according to the invention, foam material attached on or around the roof element contains a drain edge body having the drain edge.

13 Claims, 4 Drawing Sheets

(56) References Cited

FOREIGN PATENT DOCUMENTS

DE        60132850 T2    2/2009
DE    102009025120 A1    4/2010
FR         2988767 A1   10/2013

OTHER PUBLICATIONS

International Preliminary Report on Patentability issued against corresponding international application No. PCT/EP2016/056442.
Written Opinion of the International Searching Authority issued against International Application No. PCT/EP2016/056442 dated Jun. 20, 2016.

* cited by examiner

VEHICLE ROOF MODULE HAVING A ROOF ELEMENT AND A ROLLER BLIND APPARATUS

CROSS-REFERENCE TO RELATED APPLICATIONS

This application is a U.S. national phase application filed under 35 U.S.C. § 371 of International Application No. PCT/EP2016/056442, filed Mar. 23, 2016, designating the United States, which claims priority from German Patent Application No. 10 2015 005 167.9, filed Apr. 23 2015, which are hereby incorporated herein by reference in their entirety for all purposes.

FIELD

The invention relates to a vehicle roof module having a transparent roof element and a roller blind apparatus arranged under the roof element and having a roller blind track, which is wound on a winding shaft and can be pulled out to cover the underside of the roof element, and which is guided by a drain edge when pulled out from the winding shaft.

BACKGROUND

From DE 100 39 522 A1, a generic vehicle roof module is known having a transparent roof membrane and a roller blind apparatus arranged under the roof membrane. A frame-type inner shell of the roof module is formed of a foam material embedding and attached to the underside of the roof membrane. A rear frame component of the inner shell features a lower frame element flatly extending forward from a connecting bridge with the foam and delineating a cavity toward the roof membrane, in which a winding shaft of the roller blind apparatus is pivoted on the lower frame element by means of bearing blocks on both sides. A roller blind track is wound on a winding shaft such that it unwinds from the underside of the winding shaft when the roller blind track is pulled forward under the roof membrane. The roller blind track slides with the exposed underside facing the interior of the vehicle over a drain edge-forming ridge on the front edge of the lower frame element. A problem here is the mounting of the winding shaft on the bearing blocks of the lower frame element, since for this only a gap between the ridge and the roof membrane is available that must be accordingly wide. The foam material embedding of the lower frame element is malleable to a certain extent, so that the lower frame element can be bent downward for the mounting of the winding shaft. On the other hand, this malleability may complicate a stable stationary bearing of the winding shaft and the stable positioning of the ridge forming the drain edge. Furthermore, the sliding of the roller blind track on its exposed underside may cause an impairment on the surface of the roller blind track at the ridge, for instance when contamination on the ridge is transferred to the surface of the roller blind track.

The task underlying the invention is to create a vehicle roof module as mentioned above, featuring an improved roller blind apparatus.

In the vehicle roof module mentioned above, this task is solved according to the invention in that a foaming material applied on or around the roof element contains a drain edge body comprising the drain edge.

Advantageous embodiments of the invention are indicated in the dependent claims.

In the vehicle roof module according to the invention, the drain edge is therefore a part of the roof element, and is attached with it as a single unit to the roof module. Consequently, no special fixation device or anything similar is required for mounting the drain edge or a component supporting the drain edge.

The roof element may be, for instance, a fixed glass element or an FTM (fixed transparent module), and specifically, a glass cover or a plastic cover made out of a transparent or translucent plastic material such as PC or PMMA. The roof element features a foam material embedding which is attached at least to the underside of the roof element in proximity to the edge of the roof element or the cover, and which features, for instance, a reinforcement frame or a mount for a seal, or which also surrounds the edge of the roof element by means of an edge protector.

This form of foam material attachment, which may be executed circumferentially around the edge of the roof element, is formed with an extension in the area of the winding shaft of the roller blind apparatus which constitutes a drain edge body containing the drain edge. The drain edge is therefore arranged stable in form and stable in its position relative to the roof element and to the winding shaft. Since the drain edge, or respectively, the drain edge body, is created with the production of the foam material embedding, no additional or subsequent mounting process is required. The length of the drain edge body in the direction transverse to that of the roof module or of the roof element, respectively, essentially corresponds with the width of the roller blind track or with the length of the winding shaft.

Expediently, the drain edge body extends downward from the roof element in the form of a bar or of a bridge, but it is not limited to such a form. In particular, the bridge-shaped drain edge body extends downward directly from the underside of the roof element.

SUMMARY

According to a preferred embodiment, it is envisaged that the drain edge is formed by the drain edge body of the foam material embedding itself. Accordingly, the drain edge is provided by the foam material embedding without requiring any additional component.

According to an alternative embodiment, the drain edge may consist of, or be covered by, a layer or a foil applied onto the drain edge body. In principle, the drain edge body determines the form of the drain edge, and the layer or foil forms a coating, over which the roller blind track can slide. The layer or foil may have special characteristics that the foam material embedding may not have, in particular with respect to improved sliding properties of the roller blind track over the drain edge and the resistance of the drain edge to wear.

Furthermore, in a preferred embodiment, the drain edge may consist of an additional component arranged on the drain edge body. Such an additional component may, for instance, feature special material properties or a special material form.

In particular, the additional component may be arranged in a fixed or detachable manner on the drain edge body, and expediently it may be pinned, clipped, glued, or foamed onto it. Thus, for instance, a drain edge consisting of a hard material resistant to abrasion may be positioned on a drain edge body consisting of a softer foam material.

The drain edge may be formed by a curved surface, so that the roller blind track is in a smooth sliding contact with the drain edge. However, the drain edge may also be embodied as a narrow edge. The curved surface may, for instance, be formed of a segment of the drain edge body or of the additional component forming the drain edge, the segment being, for instance, a circular or an elliptical cross section.

Even though it is preferred that the drain edge extend continuously, it may also feature at least one discontinuation. The discontinuation may, for instance, be an opening or a recess in the drain edge body or in the additional body.

The drain edge may extend in a straight line. However, it may also feature at least one edge segment that is curved upward, that is, towards the roof element, or follow an upward curve over its entire length. The winding shaft itself may feature an upward bend or curvature, prescribing the curvature of the pulled-out segment of the roller blind track. A roller blind apparatus with such a winding shaft is known from DE 10 2006 046 105 A1.

Preferentially, the winding shaft and its roller blind track and the drain edge are arranged in such a mutual configuration that when being unwound from the winding shaft, the roller blind track slides with its upper side facing the roof element over the drain edge. In that case, it is ruled out that the underside of the roller blind track, which faces the interior of the vehicle and is within the field of vision of the occupants of the vehicle, can be contaminated or damaged by the drain edge or by deposits or contaminants on the drain edge.

If the winding shaft is pivoted on the roof module, and specifically, on a roof module frame, and therefore on a rigid component, such a bearing may be accomplished with the requisite degree of rigidity, so that vibrations of the winding shaft while driving can be avoided.

The winding shaft may be covered on its lower side by a canopy, specifically, one that is connected to the roof module frame. The canopy does not assume a bearing function for the winding shaft, but is mounted as a separate component, independent of the winding shaft.

BRIEF DESCRIPTIONS OF THE DRAWINGS

Hereunder, the invention is further explained by means of exemplary embodiments of a vehicle roof module according to the invention, with reference to the drawing, as follows.

Figure 1:
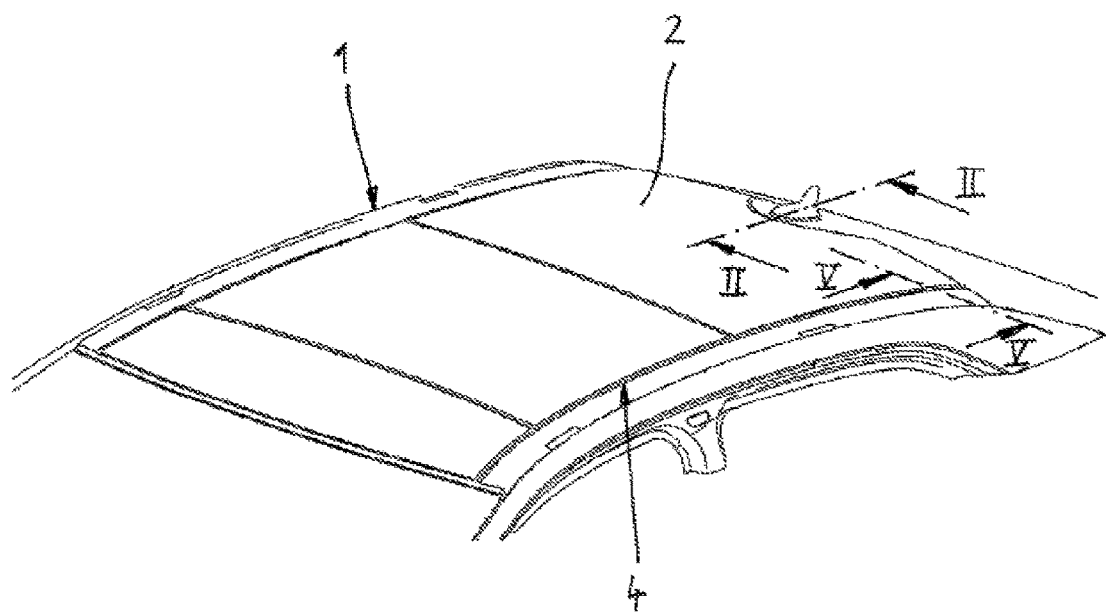
FIG. 1 shows an isometric view of a vehicle roof having a fixedly attached roof element of a roof module, which may feature further roof elements.
Figure 5:
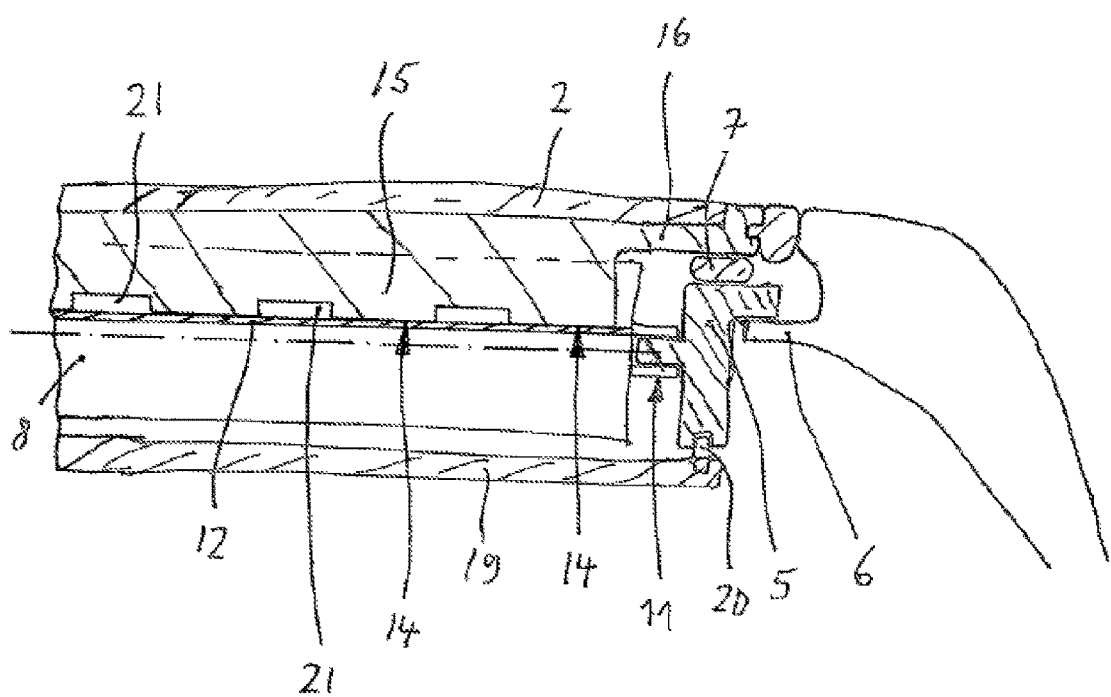
Figure 6:
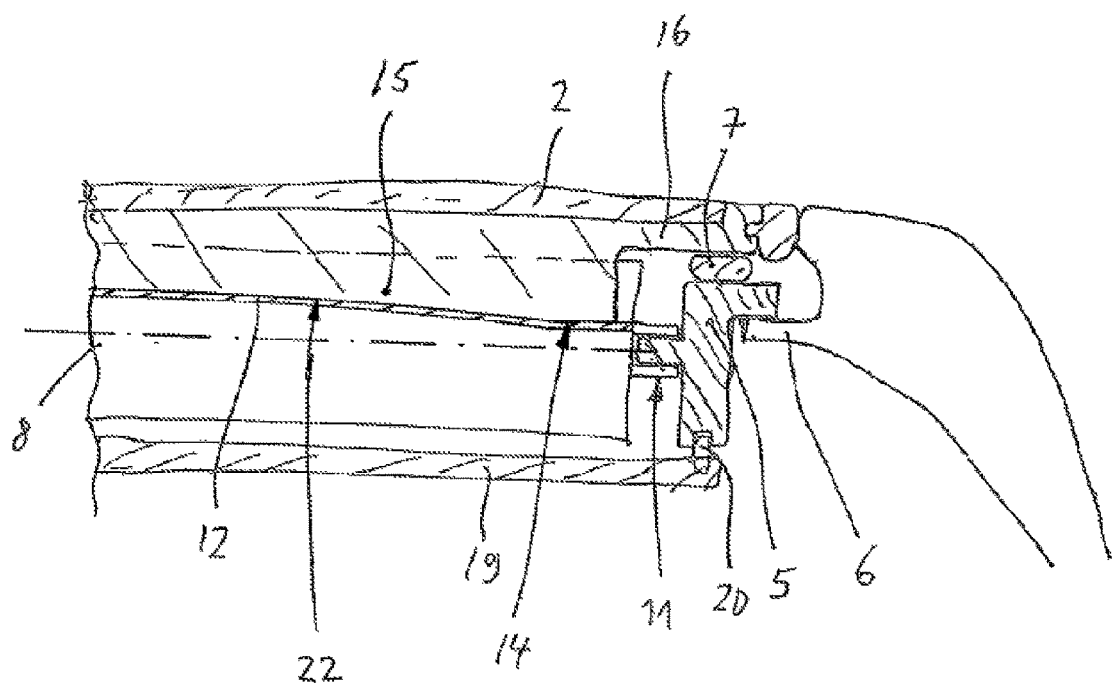

FIG. 5 schematically shows a traverse section along line V-V in FIG. 1 of a side area of the roof module with the drain edge and a winding shaft of the roller blind apparatus and a bearing device bearing the winding shaft; and FIG. 6 schematically shows a traverse section according to FIG. 5 of the side area of the roof module having a drain edge featuring an upward curvature.

DETAILED DESCRIPTION

A vehicle roof 1 of a vehicle such as, for instance, a passenger vehicle, features a roof element in the form of a cover 2 (see FIG. 1), consisting of a translucent material, more specifically, which is a glass cover, and which solidly closes a roof opening 3. In particular, the cover 2 is a part of a roof module 4 featuring a roof module frame 5, via which it is connected to a roof frame 6 of the vehicle roof 1 which surrounds the roof opening 3. The roof module 4 may also comprise additional roof elements or covers before or behind the fixedly built-in cover 2. According to the embodiment shown in FIG. 2, the cover 2 is attached to the roof module frame 5 by means of circumferential adhesive beading 7. The cover 2 may also be attached directly to the roof frame 6.

Underneath the cover 2, a winding shaft 8 of a roller blind apparatus 9 is pivoted. The winding shaft 8 is arranged in proximity of a shank 10 of a rear transverse section of the roof module frame 5, and pivoted by means of a bearing device having bearings 11 located on both sides of the winding shaft 8 which are attached to the roof module frame 5 (see FIG. 5). A roller blind track 12 is wound on the winding shaft 8, which is preloaded by spring force in the winding direction, and can be unwound from the winding shaft 8 by countering the spring force. The roller blind track 12 can be unwound from the winding shaft 8 on the upper side facing the cover 2, and can be pulled out in a forward direction by means of a drawing arch 13 under the cover 2, such that the translucent area of the cover 2 can be partially or entirely covered and shaded. The drawing arch 13 is movably guided on both sides along longitudinal guide rails of the roof module 4, specifically such that they are arranged on the roof module frame 5, and can be adjusted specifically by a driving device in a customary manner.

The roller blind track 12 is guided over a drain edge 14 which is arranged ahead of the winding shaft 8 in the drawing direction, and in proximity to it. The drain edge 14 is arranged and formed at the lower end of the drain edge body 15. The drain edge body 15 extends downward from the cover 2 in the form of a bridge or a bar, end extends in the direction transverse to the roof, parallel to the winding shaft 8, essentially over the length of the winding shaft 8. The drain edge body 15 is embodied as a part of the foam material embedding 16 of the cover 2, for instance out of PU foam. Such a foam material embedding 16 of the cover 2 is envisaged, for instance, for the foam-embedding of a frame component strengthening the cover 2, or by way of a seal carrier. The drain edge body 15 may be formed, for instance, as the front part of the foam material embedding 16 that extends transversely along the rear end of the cover 2, the foam material embedding 16 is shown only schematically in FIGS. 2 through 4 and shortened in the longitudinal direction of the cover 2.

The drain edge 14 of the drain edge body 15 is spaced from the winding shaft 8 and from the underside of the cover such that the roller blind track 12, when entirely wound up and at the maximum unwinding radius, as well as when entirely unwound and at the minimum unwinding radius, is always guided with its outer or upper surface over the drain edge 14. The underside or the inner surface of the roller blind track 12 that is visible from the interior of the vehicle is therefore not in contact with the drain edge 14.

The drain edge 14 may be approximately linear, or it may have a curved or rounded cross-section, so that the roller blind track 12 may also be guided at the drain edge 14 over a surface.

Figure 2:
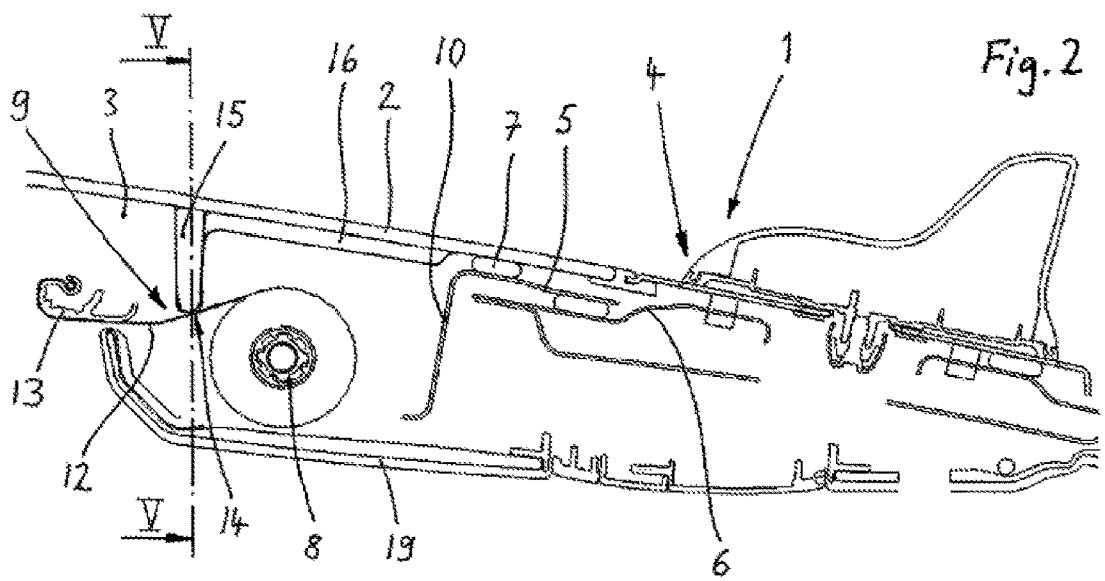
FIG. 2 shows a longitudinal section along line II-II in FIG. 1 of a rear-facing end section of the roof module having a fixedly attached roof element or cover and having a roller blind apparatus arranged underneath the cover, of which the roller blind track is guided over a drain edge attached to the cover.

FIG. 2 shows a first embodiment, in which the drain edge 14 is formed by the lower edge of the drain edge body 15 itself, the roller blind track 12 therefore sliding directly over the plastic foam material of the foam embedding 16, or of the drain edge body 15, respectively.

Figure 3:
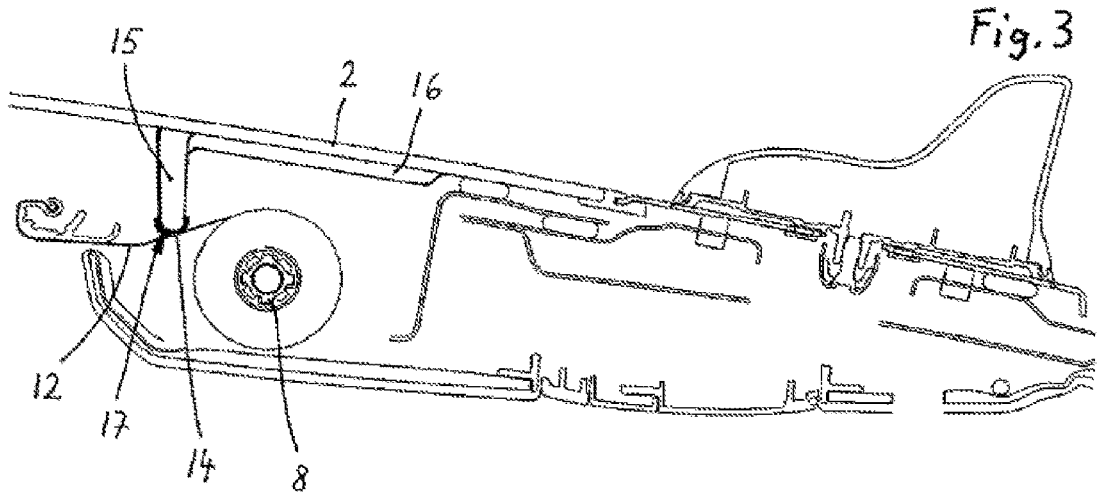
FIG. 3 shows a longitudinal section according to FIG. 2 of the vehicle roof shown in FIG. 2 with a second embodiment of the drain edge.

FIG. 3 shows a second embodiment, in which a layer or a foil 17 or something similar is applied onto the lower edge of the drain edge body 15, or specifically, glued on to it, which forms the drain edge 14 over which the roller blind track 12 slides. With the foil 17, an advantageous materials combination may be accomplished for the guiding and the supporting of the roller blind track 12.

Figure 4:
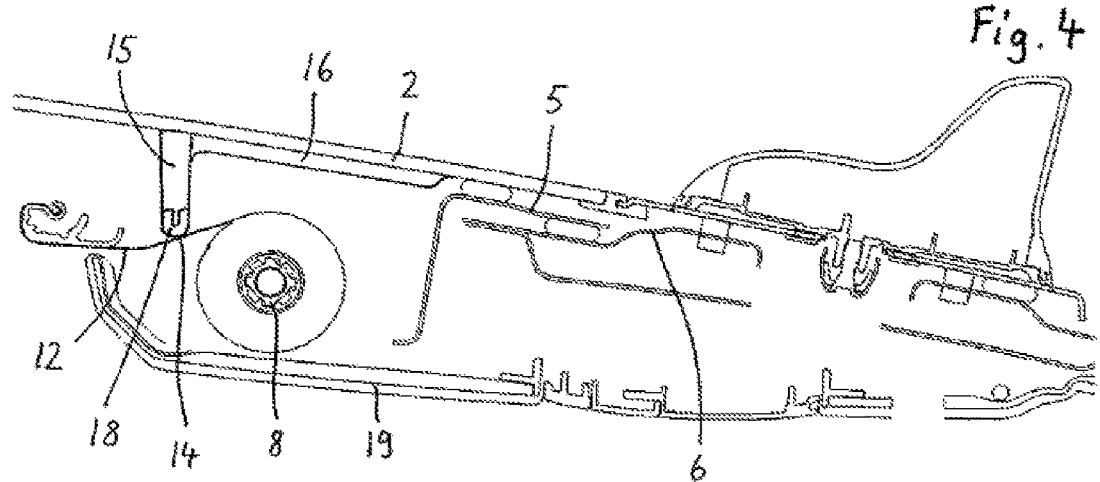
FIG. 4 shows a longitudinal section according to FIG. 2 of the vehicle roof shown in FIG. 2 with a third embodiment of the drain edge.

FIG. 4 shows a third embodiment, in which an additional component 18 is attached to the lower edge of the drain edge body 15, for instance by means of a pinning, clipping, or adhesive connection, which forms the drain edge 14 over which the roller blind track 12 slides. The additional component 18 too may accomplish an advantageous materials combination for the sliding support of the roller blind track 12. When additional components 18 are available in a variety of forms and sizes, the position of the drain edge 14 may be varied by means of the exchange or respective selection of a respective additional component 18. For instance, the additional component 18 may be pinned onto a bridge-shaped edge of the drain edge body 15, clamped onto it, or affixed to it by means of a catch mechanism.

Underneath the winding shaft 8, a canopy 19 or a lining is applied, which covers the underside of the winding shaft 8 without being in contact with the roller blind track 12. The canopy 19 is connected to the roof module 4, or respectively, to the roof module frame 5, for instance by means of clipping connections 20.

The drain edge 14 may be approximately linear (see FIG. 5), or it may have at least one curved or rounded edge segment 22 (see FIG. 6), in particular a central curved edge segment 22, or it may be curved over its entirely length. The drain edge 14 may also have at least one discontinuation 21 (see FIG. 5), which may be formed by a recess in the drain edge body 15.

The individual characteristics disclosed in the description and by way of the exemplary embodiment may be combined in any technically expedient arrangement and form with the subject of the invention in its general form.

The invention claimed is:

1. A vehicle roof module having a transparent roof element and a roller blind apparatus arranged under the roof element and having a roller blind, which is wound on a winding shaft and can be pulled out to cover the underside of the roof element, and which is guided by a drain edge when pulled out from the winding shaft, wherein a foam material attached on the roof element contains a drain edge body having the drain edge.

2. Vehicle roof module according to claim 1, wherein the drain edge body extends downward from the roof element in the form of a bar.

3. Vehicle roof module according to claim 1, wherein the drain edge is formed by the drain edge body of the foam material embedding.

4. Vehicle roof module according to claim 1, wherein the drain edge consists of, or is covered by, a layer or a foil applied onto the drain edge body.

5. Vehicle roof module according to claim 1, wherein the drain edge consists of an additional component arranged on the drain edge body.

6. Vehicle roof module according to claim 5, wherein the additional component is arranged in a fixed manner on the drain edge body.

7. Vehicle roof module according to claim 1, wherein the drain edge is formed by a curved surface.

8. Vehicle roof module according to claim 1, wherein the drain edge features at least one discontinuation.

9. Vehicle roof module according to claim 1, wherein the drain edge features at least one edge segment that is curved upward, towards the roof element.

10. Vehicle roof module according to claim 1, wherein the winding shaft and its roller blind and the drain edge are arranged in such a mutual configuration that when being unwound from the winding shaft, the roller blind slides with its upper side facing the roof element with the drain edge intermediate.

11. Vehicle roof module according to claim 1, wherein the winding shaft is pivoted on a roof module frame.

12. Vehicle roof module according to claim 1, wherein the winding shaft is covered on its lower side by a canopy connected to the roof module frame.

13. Vehicle roof module according to claim 6, wherein the additional component is arranged in a fixed on the drain edge body by at least one of being glued, or foamed onto it.

\* \* \* \* \*